Dec. 29, 1959  J. DICHTER  2,918,753
MEANS FOR PRODUCING OPENINGS OF PREDETERMINED
SIZE ON GLASS BODIES
Filed Aug. 20, 1954  2 Sheets-Sheet 1

Inventor:
JAKOB DICHTER

Dec. 29, 1959   J. DICHTER   2,918,753
MEANS FOR PRODUCING OPENINGS OF PREDETERMINED
SIZE ON GLASS BODIES
Filed Aug. 20, 1954   2 Sheets-Sheet 2
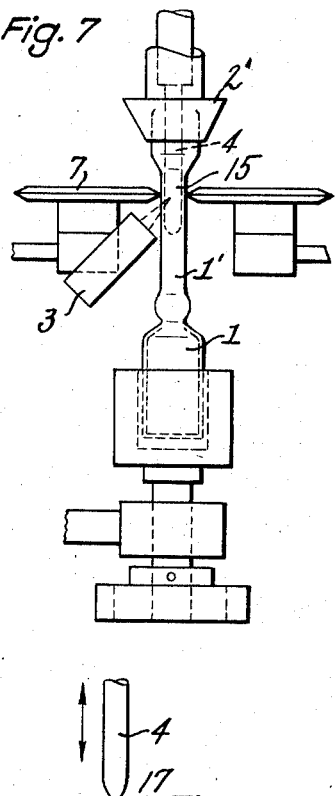
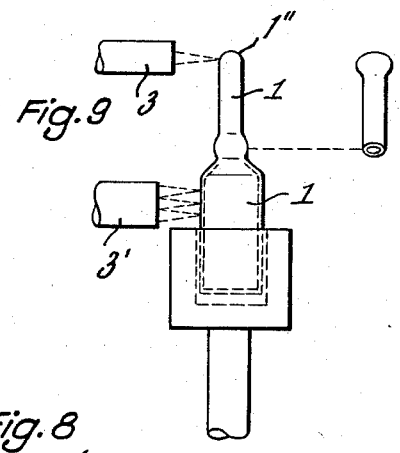
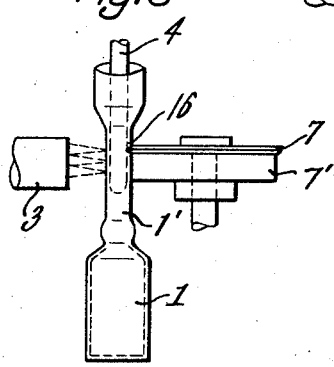
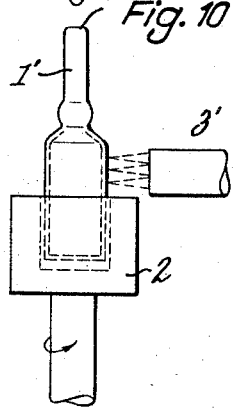
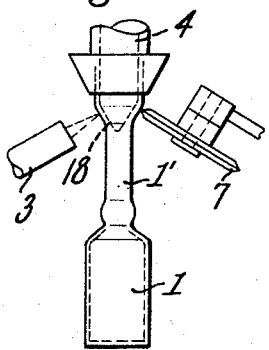
Inventor:
JAKOB DICHTER

# United States Patent Office 2,918,753
Patented Dec. 29, 1959

2,918,753

MEANS FOR PRODUCING OPENINGS OF PREDETERMINED SIZE ON GLASS BODIES

Jakob Dichter, Berlin-Schoeneberg, Germany

Application August 20, 1954, Serial No. 451,274

Claims priority, application Germany August 24, 1953

1 Claim. (Cl. 49—7)

The present invention relates to means for opening glass bodies, such as ampullas, vials, and the like.

In most cases the opening of glass bodies occurs only shortly before the same are filled, and to this end before filling of the glass body, an excess or prolonged end is scratched or broken at the location of severance, whereupon the edge is subsequently fused.

Due to the preliminary scratching and breaking, splinters result easily which often enter the interior of the glass body. Therefore, it is desired to bring about the opening of such glass bodies or containers without injurious effects.

It has been already proposed to open the bodies of ampullas and the like during the manufacture thereof by upsetting the ends of collar portions under the action of increased heat and then by suddenly withdrawing the heat at the upset location whereby the container is being blown open. However, such operational steps do not avoid completely the formation of splinters.

The present invention overcomes these and other disadvantages and is directed to considerable improvements in the manufacture of glass bodies for ampullas, vials, and the like.

It is one of the objects of the present invention to provide means facilitating a convenient process for opening a glass ampulla at its reduced end or collar-shaped portion without scratching or breaking the same.

It is another object of the present invention to provide means affording the opening of a glass blown container or body under simultaneous application of heat and mechanical severing means, whereby a clean separation of the container end is obtained.

Yet another object of the invention is to provide means contributing to a simplified and speedy manufacture of glass ampullas and the like articles, whereby opening of the same, severance of the end and calibration and shaping of the opening of the ampulla may be performed substantially at one and the same time.

Still a further object of the present invention is to provide means permitting the employment of a combination cutting and shaping tool relative to a heated location at which a mandrel becomes effective to thereby act on the reduced portion of a glass ampulla and at its opening.

The above and other objects of the invention will become further apparent from the following detailed description, reference being made to the accompanying drawings showing several embodiments of the invention.

Figure 4:
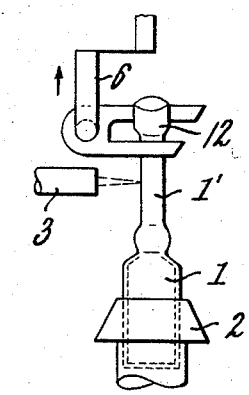
Figure 5:
Figure 6:
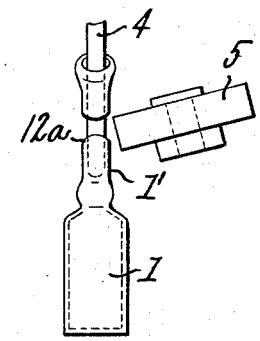

Figs. 4, 5 and 6 further illustrate schematically modified means for opening and working of ampullas.

Fig. 7 shows diagrammatically a machine for holding an ampulla body with a mandrel inserted in a reduced open end thereof, which is simultaneously worked upon by burner and cutting means.

Fig. 8 illustrates further diagrammatically the application of burner, cutting and shaping means to an ampulla end with inserted mandrel.

Figs. 9 and 10 show, respectively, heat treatment of a closed ampulla body and end thereof to provide an opening for the insertion of a mandrel thereinto.

Fig. 11 illustrates further schematically shaping and calibrating means applied to an ampulla end.

Fig. 12 shows an ampulla or phial obtained according to the invention.

Figure 1:
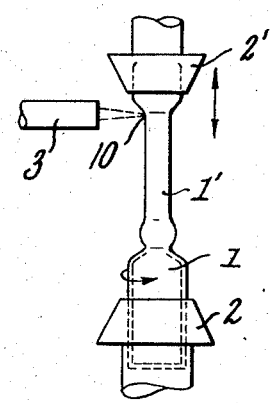
Fig. 1 shows diagrammatically one means for opening a glass body.
Figure 2:
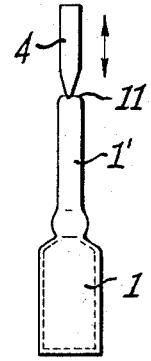
Figs. 2 and 3 show further means for the preparation of the glass body after severance.
Figure 3:
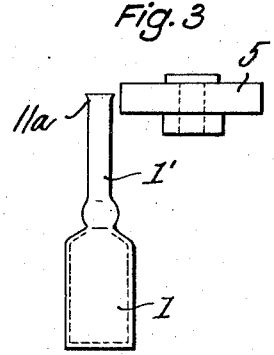

Referring now more particularly to the drawings, there are disclosed in Fig. 1 some operational steps, how the glass body of an ampulla 1 is held by clamping or supporting devices 2, 2' which are rotated relative to a location of separation at 10 forming a reduced zone, at which a gas burner 3 is located. Ampulla 1 has an elongated portion 1'. The heated part of portion 1' at 10 is then drawn during heating by means of clamping device 2' so that a separation and opening of the ampulla portion 1' will occur at 10 without closing again said ampulla portion 1'. The opening 11 thus obtained (Fig. 2) is subsequently expanded while still in soft state by means of a mandrel 4. Opening 11 due to centrifugal force during rotation of the glass body 1 is then further expanded to assume an outwardly bent shape 11a (Fig. 3).

In order to rotate ampulla body 1, clamping device 2, 2' may be provided with a pulley and belt drive (not shown). The expanded opening 11a is subsequently subjected to the action of one or more shaping tools 5 (Fig. 3), so that the ampulla opening or end will assume shape and dimension, as desired.

According to Figs. 4 to 6 the ampulla is held in a supporting device 2, while the collar or reduced portion 1' of the ampulla 1 is drawn by means of a known drawing device 6 which grips the upper end 12 of the ampulla.

The severance and opening of the ampulla is effectuated by a gas burner 3 acting at the location of separation, so that opening 12a is obtained (Fig. 5), which may be brought to desired dimension by means of an inserted mandrel 4 and shaping tool 5. Thus, end 12a assumes its correct size, at which fusion of the end of the ampulla 1 will be carried out.

According to Fig. 7 reduced ampulla portion 1' is heated by means of gas burner 3 at a location 15. Through clamping or holding device 2' extends mandrel 4 while cutting devices or disks 7 are likewise advanced toward location 15 to thereby act on the heated wall of the glass portion 1'. Thus, the ampulla portion 1' after being brought to the desired dimension by mandrel 4 is then cut and severed at 15.

According to Fig. 8 the cutting tool or disk 7 is combined with a shaping tool 7' acting on the location of severance 16 while burner 3 transfers heat to said location 16 and mandrel 4 is advanced to the latter in order to bring ampulla portion 1' to the desired inner dimension.

The means according to Fig. 8 are of particular importance as shaping, severance and calibration occur in one and the same operational step while applying concentrated heat at location 16.

It is well understood that these operational steps may be carried out in a predetermined and timed sequence.

Figs. 9 and 10 further illustrate means whereby the ampulla body 1 with its reduced portion 1' is brought during manufacture to the desired length and dimension by means of mandrel 4. Burner means 3' transfer heat to the ampulla body while burner 3 acts on the end 1" to close the same. Burner 3' when applied to the closed body 1 produces in the interior of said body an increased air pressure which causes upon heating the closed end 1"

by means of burner 3 that the end is finally blown open without risking any splinters. By the use of centrifugal force, shaping tools and/or calibrating mandrel 4, the open end 17 may then be brought to the desired inner dimension.

This mode of operation ensures that the reduced portion 1' upon prior opening may be fused without formation of a thickened end.

It is advantageous that the fusion may be carried out in a manner so that after the end is closed the interior of the ampulla body will be subjected during heating to increased overpressure, whereby the still soft and closed end will assume a rounded shape so that it will later on easily be blown open and will not show any considerable constrictions.

The invention further contemplates the production of ampullae from long and continuously fed glass tubes in uninterrupted operation by cutting predetermined lengths of ampulla bodies from said tube, and then subsequently working each cut ampulla length in a manner as hereinabove disclosed.

Fig. 11 shows in somewhat modified form the employment of an apparatus with an inclined cutting disc or like severing means 7 and an inclined burner or like heating means 3 at opposite sides of a tubular glass ampulla body 1 having a reduced end 1' into which mandrel 4 is inserted. Mandrel 4 has an end of substantially conical formation and of predetermined size and shape. This end is positioned in the reduced end 1' of the ampulla body 1 and is axially aligned therewith, to impart this form to the wall of the ampulla portion 1' therewithin and at a location 18, against which the oppositely positioned cutting disc 7 and burner 3 are directed in a converging manner for contact with said portion.

As clearly depicted in Fig. 11, disc 7 and the flame of burner 3 are arranged to extend in respective planes at acute angles to the axis of the tubular body 1, which planes intersect each other approximately at said axis and are normal to the conical end of said mandrel 4.

Thus, the reduced end 1' of the ampulla body 1 may be provided with an opening at 18 without splintering effect, and may be shaped according to the size and shape of the conical mandrel end formation.

The new means facilitates the severance of the closed end of a reduced portion of an ampulla, the working of the opening of a fused ampulla end without scratching or like effect, as well as fusing the edge and calibrating the reduced ampulla end to desired size, length and diameter.

The ampulla 1 as seen in Figure 12 has the reduced portion 1' and the shaped end 1''', whereby during filling by means of a hollow needle (not shown) drops which are formed at the end thereof, will be stripped off inside opening 1''', so that said opening 1''' which is to be fused for closing the ampulla will not be wetted by the liquid previously introduced into the ampulla.

The particular shape of the ampulla shown in Fig. 12 will further be advantageous upon opening of the same when it is desired to withdraw any liquid from the interior of the ampulla.

The apparatus according to the invention may be arranged in any desired position for the ampulla body, either vertical, horizontal or inclined, while the end of the reduced portion may be directed upwardly or downwardly.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

An apparatus for treating the reduced end of a tubular glass body having a longitudinal axis; comprising means for rotating said glass body about said axis, a mandrel having an end of substantially conical formation, said conical mandrel end formation being positioned in said reduced end of said glass body for shaping purposes, severing means positioned adjacent said conical mandrel end and at a location of said reduced end at which said glass body is to be severed, said severing means extending in a plane at an acute angle relative to said axis and normal to said conical formation, and heating means positioned opposite said severing means and directed at the same acute angle relative to said axis for imparting heat to said reduced end of said glass body sufficient to enable said severing means to sever and provide an opening in said reduced body end location substantially without splintering effect and to thereby simultaneously shape said opening according to the size and shape of said conical mandrel end formation.

References Cited in the file of this patent

UNITED STATES PATENTS

| | | |
|---|---|---|
| 2,224,486 | Richter | Dec. 10, 1940 |
| 2,266,417 | Eisler | Dec. 16, 1941 |
| 2,392,104 | Smith | Jan. 1, 1946 |
| 2,475,915 | Orr | July 12, 1949 |
| 2,582,818 | Coby | Jan. 15, 1952 |
| 2,595,077 | Hughes et al. | Apr. 29, 1952 |

FOREIGN PATENTS

| | | |
|---|---|---|
| 409,283 | Great Britain | Apr. 24, 1934 |